United States Patent [19]
Huff

[11] Patent Number: 5,160,474
[45] Date of Patent: Nov. 3, 1992

[54] OVERMOLDED GASKET, HEAT EXCHANGER TANK INCORPORATING THE SAME AND METHOD FOR MAKING THE SAME

[75] Inventor: James W. Huff, Williamsville, N.Y.

[73] Assignee: Cadillac Rubber & Plastics, Inc., Cadillac, Mich.

[21] Appl. No.: 632,363

[22] Filed: Dec. 21, 1990

[51] Int. Cl.⁵ .............................................. B29C 65/56
[52] U.S. Cl. ..................................... 264/255; 264/274; 264/296; 165/173; 29/890.052
[58] Field of Search ............... 165/173, 166, 167, 175, 165/178; 29/890.052; 264/255, 274, 296

[56] References Cited

U.S. PATENT DOCUMENTS

| | | |
|---|---|---|
| 2,706,577 | 4/1955 | Wolf . |
| 2,717,793 | 9/1955 | Nenzell . |
| 3,004,297 | 10/1961 | Stover . |
| 3,280,372 | 10/1966 | De Pew . |
| 3,409,201 | 11/1968 | Carpenter, Jr. . |
| 3,420,927 | 1/1969 | Corrinet . |
| 3,597,298 | 8/1971 | Stengle, Jr. . |
| 3,624,885 | 12/1971 | Holliday et al. . |
| 3,631,895 | 1/1972 | Medina et al. . |
| 3,904,470 | 9/1975 | Fukuki et al. . |
| 3,956,817 | 5/1976 | Blumenkranz . |
| 3,969,146 | 7/1976 | Tietze . |
| 3,989,160 | 11/1976 | Manning et al. . |
| 4,041,594 | 8/1977 | Chartet . |
| 4,052,496 | 10/1977 | Goodfellow . |
| 4,070,219 | 1/1978 | Farnam . |
| 4,091,961 | 5/1978 | DuBois et al. . |
| 4,114,668 | 9/1978 | Hickey . |
| 4,121,963 | 10/1978 | Yardley et al. . |
| 4,151,696 | 5/1979 | Knights et al. . |
| 4,231,983 | 11/1980 | French . |
| 4,331,625 | 5/1982 | van de Zee et al. . |
| 4,347,947 | 9/1982 | Hammes . |
| 4,556,106 | 12/1985 | Evans ................................. 165/167 |
| 4,559,688 | 12/1985 | Abu-Isa et al. ................. 29/890.052 |
| 4,569,460 | 2/1986 | Bondy . |
| 4,584,182 | 4/1986 | Sanderson et al. . |
| 4,669,293 | 10/1987 | Duchrow ........................... 220/378 |
| 4,738,905 | 3/1988 | Collins ............................... 220/378 |
| 4,905,758 | 3/1990 | Mathur et al. ..................... 165/167 |
| 5,008,060 | 4/1991 | Kanai et al. ....................... 264/255 |

FOREIGN PATENT DOCUMENTS 2299148 12/1975 France .
147097 2/1986 Japan ................................. 165/173

Primary Examiner—Albert W. Davis, Jr.
Attorney, Agent, or Firm—Varnum, Riddering Schmidt & Howlett

[57] ABSTRACT

A method for attaching an elastomeric gasket (12, 70) to a thermoplastic substrate (10) comprises the steps of forming the substrate (10) with a slot (20) and an upstanding projection (22) adjacent the slot (20), deforming the projection (22) into an upper portion of the slot (20) to provide a stake thereby, and molding the elastomeric gasket (12, 70) onto the substrate (10) and into the slot (20). The elastomeric gasket (12, 70) is thereby retained on the substrate (10) by the projection (22) in cooperation with the slot (20). The substrate (10) is preferably made of a nylon material, and the elastomeric gasket (12, 70) is preferably made of an EPDM polymer.

17 Claims, 2 Drawing Sheets

OVERMOLDED GASKET, HEAT EXCHANGER TANK INCORPORATING THE SAME AND METHOD FOR MAKING THE SAME

BACKGROUND OF THE INVENTION

1. Field of the Invention

This invention relates to overmolding elastomeric shapes onto a thermoplastic substrate. In one of its aspects, the invention relates to a heat exchanger tank having an overmolded gasket and a method for making the same. In another of its aspects, the invention relates to a method of overmolding an elastomeric shape onto a plastic substrate. In another of its aspects, the invention relates to a thermoplastic article having an elastomeric article mechanically adhered thereto. In yet another of its aspects, the invention relates to a nylon automotive radiator tank having means for mechanically retaining an overmolded gasket onto the tank.

2. Description of the Related Art

Over the past decade, the automotive radiator industry has progressed from using braised copper radiators to radiators having aluminum tubes and tube headers and nylon tanks. These more recent designs require an elastomeric gasket to provide a fluid-tight seal between the nylon tank and the aluminum tube header.

Typically, a separate, premanufactured gasket is secured to the header, either adhesively or by other means, and then the tube header is mechanically attached to the tank. This technique, however, is labor intensive in that a worker is required to separately assemble the gasket onto the tank. Also, separate storage facilities are required for maintaining a supply of gaskets at the assembly area.

Furthermore, the gasket affords an effective fluid tight seal only if it is properly positioned on the tank. However, with the press of time during assembly, it is difficult to accurately control the location of the gasket on the tank. Mispositioned gaskets may cause defective assemblies that have to be either reassembled at the manufacturing site or discarded. Further, defective assemblies that are not detected at the manufacturing plant may fail prematurely in the field with obvious deleterious consequences.

One solution to this problem has been to preassemble the gasket on the tank by overmolding the gasket to the tank. U.S. Pat. No. 4,559,688 issued Dec. 24, 1985 to Abu-Isa, et al. discloses an overmolded gasket adhesively bonded to a flat surface of a nylon radiator tank. This approach has not enjoyed commercial success because of economic considerations.

Thus, there remains the need for a technique for retaining an overmolded gasket on a heat exchanger or radiator tank.

SUMMARY OF THE INVENTION

According to the invention, there is provided a method for attaching an elastomeric gasket to a thermoplastic substrate comprising the steps of forming the substrate with at least one slot and an upstanding projection adjacent the slot, deforming the projection into an upper portion of the channel to provide a stake thereby, and molding the elastomeric gasket onto the substrate and into the channel, whereby the gasket is mechanically retained on the substrate through the projection.

Preferably, the substrate is heated before the deforming step. In a preferred embodiment, the substrate is a nylon material, and the gasket is a thermosetting elastomer. Preferably, the elastomer is an EPDM polymer.

In a preferred embodiment of the invention, the substrate is a heat exchanger tank having an upper sealing rim and a gasket is molded onto the sealing rim. The heat exchanger tank is molded with gasket retainer projections or fingers formed on the sealing rim thereof and having a side in common with the channel. The gasket is overmolded onto the tank on the sealing rim thereof to mechanically interlock the gasket and the gasket retainer projections of the tank.

The retaining projections or fingers are formed adjacent to the channel and the sealing rim of the tank and are deformed into the channel during the overmolding step.

Further, according to the invention, there is provided a heat exchanger tank having an upper sealing rim and a gasket on the sealing rim wherein the gasket is mechanically retained on the sealing rim of the tank through an integral portion of the tank. The gasket is retained mechanically on the tank by a plurality of retaining fingers which extend into a channel formed in the tank.

Also, according to the invention, there is provided a laminate comprising a thermoplastic substrate, at least one slot formed in a surface of the substrate, a projection extending into the slot, and an elastomeric shape mounted onto the substrate surface and extending into the slot. The elastomeric shape is mechanically retained on the substrate through the projection. The projection can extend laterally into the slot and can extend into an upper portion of the slot.

BRIEF DESCRIPTION OF THE DRAWINGS

The invention will now be described with reference to the accompanying drawings, in which.

DETAILED DESCRIPTION OF THE PREFERRED EMBODIMENTS

Figure 1:
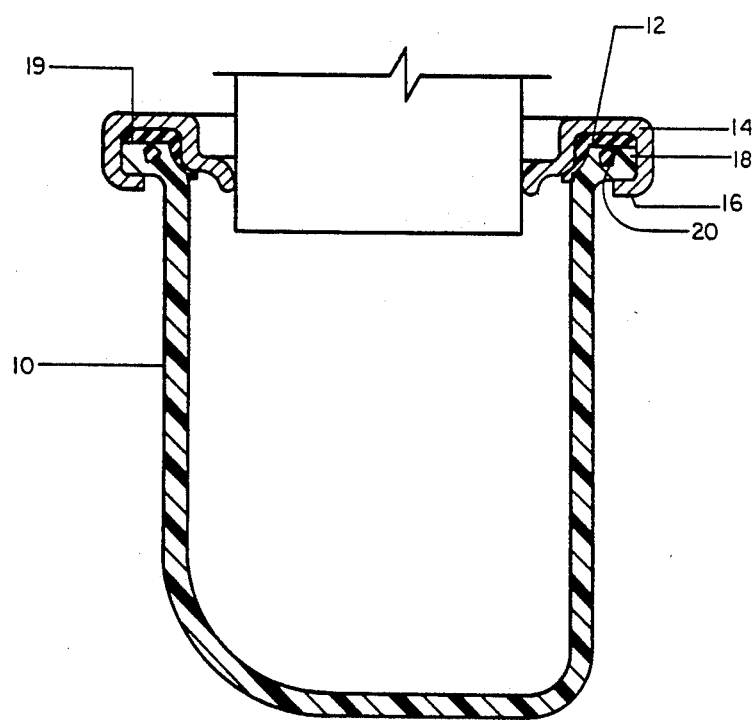
FIG. 1 is a sectional view of the heat exchanger tank with an overmolded gasket according to the invention attached thereto and also showing a tube header secured to the tank.

Turning now to the drawings, there is shown generally a heat exchanger tank 10 and an overmolded gasket 12 intermediate and in sealing engagement with both the tank 10 and a tube header 14. The arrangement shown typically might be found in a motor vehicle heat exchanger or radiator.

Heat exchanger tanks, such as the tank 10, found in current production motor vehicles, are often formed of injection molded nylon. The nylon may be filled with chopped glass fibers or other suitable fillers, or may be unfilled. The tube header 14 carries tubes (not shown separately in the drawings) through which a coolant fluid such as an ethylene glycol/water mixture circulates. The tube header 14 is mechanically secured to the tank 10, for example by tabs 16 formed about the periphery of the header. The tabs 16 are mechanically deformed to engage and bear against an underside of an annular flange 18 extending laterally from an upper edge of the tank 10. The tube header 14 is typically formed of a suitable metal such as aluminum or brass.

Figure 2:
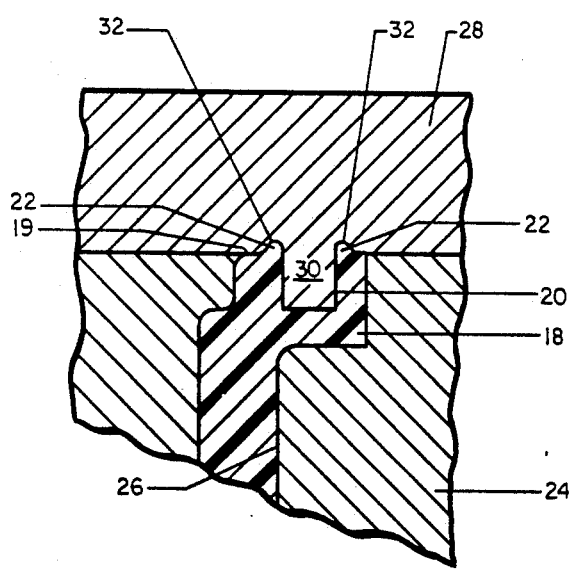
FIG. 2 is an enlarged fragmentary elevational view of a portion of the tank in a mold for forming the tank, illustrating one step in the method according to the invention.

The method of making the tank with the overmolded gasket 12 on the tank 10 is best shown in FIGS. 2-5. The annular flange 18 that extends laterally from an upper edge of the tank 10 is provided with a continuous channel, groove or slot 20. The slot 20 can also be discontinuous if desired. Pairs of projections or retaining fingers 22 integrally formed with the tank 10 are provided at regularly spaced intervals about the flange 18 and adjacent to the channel 20. As seen in FIG. 2, the projections or retaining fingers have a side in common with the channel 20. The retaining fingers 22 are disposed in facing relationship on opposite sides of the channel 20 and project upwardly or perpendicular to the upper surface 19 of the flange 18.

FIG. 2 shows the tank 10 after the first step in the process wherein the tank 10 is molded in a lower mold half 24 having a tank cavity 26. An upper mold half 28 has a channel forming projection 30 and recesses 32 for forming the retaining fingers 22. The retaining fingers 22 or projections are molded in an extended, undeformed, and/or nonretaining orientation when the tank 10 is formed. The tank molding is carried out in a conventional injection molding process in a conventional injection molding machine having molds with cavities to form the tank as illustrated in FIG. 2. The tank 10 is made from a thermoplastic material, for example, fiberglass filled nylon.

The upper mold half 28 is then removed from the lower mold half 24 and a gasket molding head 34 is then clamped to the bottom mold half 24 while the tank 10 is still in the lower mold half 24 and preferably while the tank 10 is still warm from the molding process. Alternatively, the tank 10 can be removed from the injection mold, cooled and placed in another mold at a later time. Selective heating of the annular flange can then be carried out to soften the projections or fingers 22.

Heating of the annular flange 18 is desirable but not essential. By heating the flange 18, the retaining fingers 22 can easily be deformed into desired shapes. If the entire tank 10 is heated before overmolding of the gasket, the tank expands in size and thus, can snugly fit inside a slightly larger tank cavity. Also, if the whole tank is preheated, a large transfer of heat from the gasket-forming material to the tank does not occur during the overmolding step. By preheating the tank or the annular flange 18, the gasket-forming material can be more effectively cured.

The retaining fingers 22 or the entire tank 10 can be heated using a variety of methods. The preferred method is to heat the entire tank in a forced air oven. The oven preferably includes a conveyor which moves in a circular direction inside the oven, like a merry-go-round. Each tank can be placed on the conveyor such that it is circulated in the oven. The speed of the conveyor or the oven temperature can be adjusted so that after one pass through the oven the tank is heated to the desired temperature. Preferably the tank should be heated to about 100°-200° F. below the temperature of the gasket-forming material being injected into the mold, most preferably 150° F. below the temperature of the gasket-forming material. However, if the gasket-forming material is being cured at temperatures below about 275° F., the tank need not be preheated at all.

The gasket molding head 34 has a gasket forming channel 36 and deforming corners 38, 40. As the gasket molding head 34 is mounted to the lower mold half 24, the deforming corners 38, 40 contact and deform the warm retaining fingers 22 to force them laterally into the open channel 20. Thereafter, an elastomeric polymer, e.g., EPDM, is injected under heat and pressure into the gasket forming channel 36 to form the gasket 12.

The thermoplastic substrate or tank can be made by use of conventional injection molding or die casting techniques which are well known in the art. Overmolding of the gasket onto the tank can be accomplished by use of a conventional injection molding press. For example, a Lewis injection press which utilizes a straight ram can be used, or an R.E.P. injection press which utilizes a screw ram can be used. The pressure at which the gasket molding head 34 should contact the lower mold half 24 is dependent upon the material used to make the thermoplastic substrate and upon the injection pressure of the gasket-forming material. The molding pressure must be high enough to deform the retaining fingers 22 laterally into the open channel 20. Furthermore, the molding pressure must be higher than the injection pressure of the gasket-forming material so that this material does not leak out of the mold during the overmolding step. The gasket-forming material should be injected at a pressure sufficient to fill the surfaces of the mold.

Figure 3:
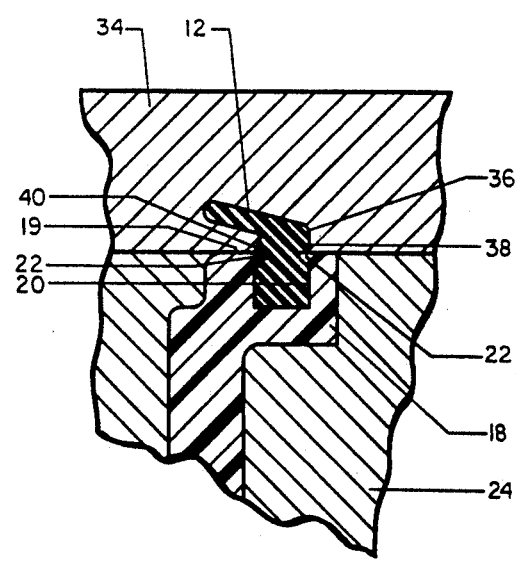
FIG. 3 is an enlarged fragmentary elevational view similar to FIG. 2, showing a second step in the method according to the invention.

As seen in FIG. 3, the gasket 12 has been overmolded onto the tank 10 and the retaining fingers 22 have been mechanically deformed, that is, crimped down or coined over, to a retaining position whereby the retaining fingers 22 extend laterally into the channel 20, bear against the gasket 12 and, in cooperation with the channel 20, mechanically retain the gasket on the tank. As described above, the retaining fingers are mechanically deformed to the retaining position during the gasket molding step.

Figure 4:
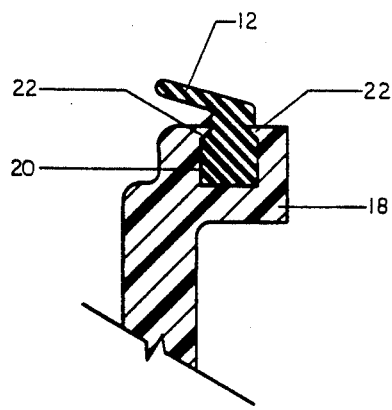
FIG. 4 is an enlarged fragmentary elevational view similar to FIGS. 2 and 3 of the tank portion and gasket after removal of the parts from the mold.

FIG. 4 illustrates the tank with the overmolded gasket.

Figure 5:
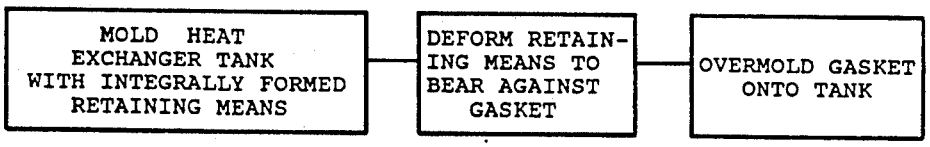
FIG. 5 is a block diagram flow chart illustrating the steps comprising the method for making the heat exchanger tank with overmolded gasket according to the invention.

The method for forming the heat exchanger tank with overmolded gasket is described generally in the block diagram flow chart of FIG. 5. In the initial step, the heat exchanger tank 10 is injection molded in conventional fashion and is formed with the annular flange 18, the channel 20, and the retaining fingers 22, as best shown in FIG. 2. Subsequent to the formation of the tank 10 and while it is still in the lower half of the tank mold (or in a separate mold), the gasket molding head is mounted onto the lower half of the tank mold. The retaining fingers 22 are deformed into the open channel 20. The gasket 12 is molded into the channel 20 around the retaining fingers 22. The gasket 12 is formed of a suitable elastomeric material such as a polymer of ethylene propylene diene monomer (EPDM) or thermoplastic rubber (TPR).

The gasket molding head 34 is removed and the gasket 12 is allowed to cool. If an automotive radiator is being manufactured, the tube header 14 is assembled on the tank 10 in sealing engagement with the gasket 12 and the tank in the manner described herein. Thus, it can be seen that the retaining fingers 22 and the channel 20 cooperate to provide means for mechanically retaining the gasket 12 on the tank 10.

Those having skill in the art of molding elastomeric materials will recognize that the operating parameters for the gasket molding head 34 may vary depending on the materials of construction. For example, if the gasket is to be formed of TPR, the gasket molding head 34 does not require preheating. On the other hand, if an EPDM gasket is desired, the gasket molding head 34 should generally be preheated to a range of approximately 350°–420° F. Of course, as increasing mold temperatures are utilized, the tank is more likely to suffer temperature distortion. However, this problem can be substantially overcome by the use of cooling fluids in the lower mold half 24. Thus, use of the cooling fluids can prevent excessive temperatures in the lower mold half even if successive gasket molding operations are undertaken. Tank distortion control may require the use of cooling forms immediately following the overmold procedure.

Figures 6, 7:
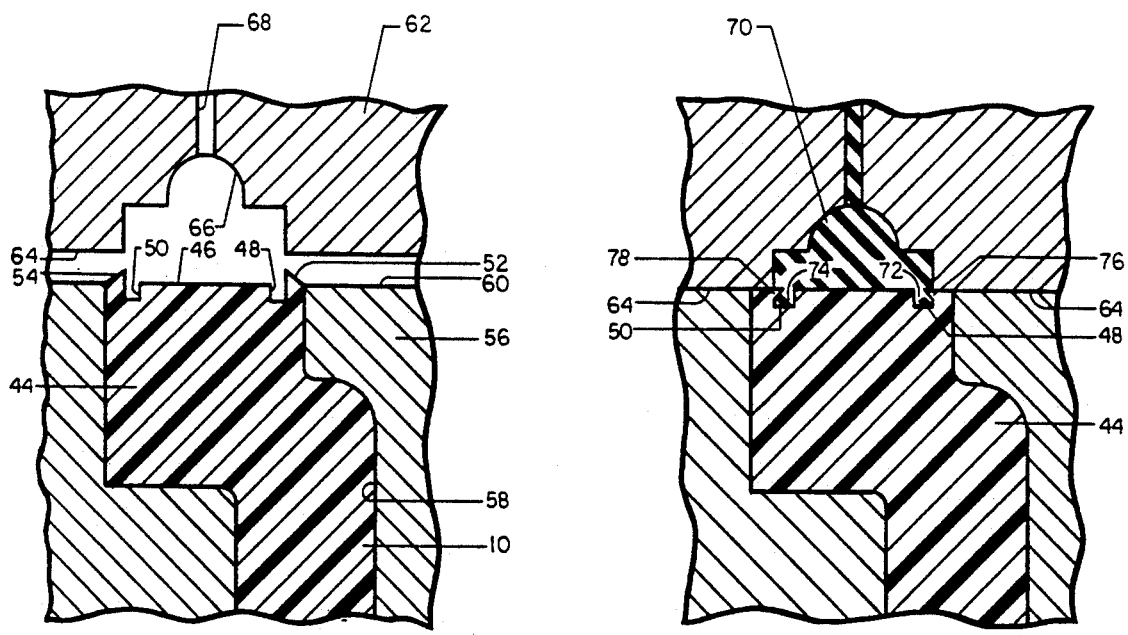
FIG. 6 is a partial sectional view, like FIGS. 2 and 3, through a portion of a thermoplastic substrate, such as a heat exchanger tank, illustrating a first step in a modified process according to the invention and illustrating a modified tank according to the invention.
FIG. 7 is a view like FIG. 6, illustrating a second step in the process wherein a gasket is overmolded onto a substrate.

Referring now to FIG. 6, there is shown a second embodiment of the invention wherein there is shown a partial section through an upper rim 44 of a heat exchanger tank 10. The upper rim 44 has an upper surface 46 with a pair of slots 48, 50. These slots 48, 50 preferably extend around the entire upper surface 46 of the upper rim 44, although the slots can be discontinuous, if desired. Ramp projections 52, 54 extend upwardly from edge portions of the upper rim 44 and are directly adjacent to slots 48, 50, respectively. The ramp projections 52, 54 have upper surfaces which extend upwardly and inwardly, terminating at a peak directly adjacent to the slots 48, 50, respectively. The ramp projections 52, 54 can be continuous or discontinuous about the rim of the tank. The projections 52, 54, however, will only be present adjacent the slots 48 and 50, respectively.

At least the upper rim 44 of the tank 10 is supported in a tank support 56 having an interior cavity 58 which closely corresponds to the outer surface of the upper rim 44. The tank support 56 has an upper surface 60 which essentially is coplanar with the upper surface 46 of the upper rim 44 of the tank 10. Thus, the ramp projections 52, 54 extend above the upper surface 60 of the tank support 56.

An injection molding head 62 has a lower surface 64 and a gasket-forming cavity 66. The lower surface 64 is coextensive with the upper surface 60 of the tank support 56 and also with the ramp projections 52, 54. The gasket-forming cavity 66 is coextensive with the upper surface 46 of the upper rim 44 and with the slots 48, 50. A molding channel 68 is provided in the injection molding head 62 for the introduction of elastomeric gasket-forming material into the cavity 66.

Referring now to FIG. 7, the injection molding head 62 moves downwardly with respect to the tank support 56 to close against the upper surface 60 thereof. During this downward movement, the lower surface 64 of the injection molding head 62 bears against the ramp projections 52, 54 to deform the projections laterally into an upper portion of the slots 48, 50 to form inwardly projecting stakes 76, 78 respectively. The elastomeric polymer in semi-fluid form is injected through the molding channel 68 in conventional fashion to fill the cavity 66 and also to fill the slots 48, 50. As illustrated in FIG. 7, the elastomeric gasket 70 is formed with two depending flanges 72, 74 which are disposed within the slots 48, 50, respectively.

After curing, the injection molding head 62 is removed to leave the gasket 70 overmolded onto the upper surface 46 of the upper rim 44 of the heat exchanger tank 10. The tank support 56 is then separated from the tank. The overmolded gasket 70 is mechanically held onto the upper surface 46 of the heat exchanger tank upper rim 44.

Thus, the invention provides an economical and expeditious way of forming essentially in a single overmolding process a mechanical stake for holding an overmolded gasket onto a thermoplastic substrate.

It is preferable that either the retaining fingers 22 (first embodiment), the ramp projections 52, 54 (second embodiment), or the entire tank 10 be heated somewhat to assist in the overmolding process. The retaining fingers 22, projections 52, 54, or tank 10 can be selectively heated in an oven or with electromagnetic radiation. Conceivably, the overmolding process can take place directly after the tank molding process so that the retaining fingers 22, projections 52, 54, or tank 10 remain warm from the tank molding process.

The thermoplastic substrate or tank can be made from a large number of thermoplastic materials including, but not limited to, polyethylene, polypropylene, polystyrene, polyvinyl chloride, ABS, polyester, polybutadiene, polycarbonate, polyisoprene, butadienestyrene copolymers, nylon, and blends thereof. These thermoplastic materials are preferably filled with glass fibers or minerals. The thermoplastic filler provides stiffness to the thermoplastic substrate or tank and preferably comprises about 25-30% of the substrate by weight. In the case of the heat exchanger tank, higher temperature plastics, such as nylons, are preferred. In a preferred embodiment, the tank is made from a fiberglass-filled nylon.

The elastomeric resin used to form the gaskets 12, 70 is preferably a thermosetting resin, most preferably an EPDM resin cured with peroxide. However, any type of elastomeric material which will flow into the channel 20 or slots 48, 50 of the thermoplastic substrate or tank and retain the shape of the mold and channel 20 or slots 48, 50 can be used. For example, thermoplastic elastomeric resins can also be used but are not preferred. Thermoplastic rubbers such as the various types of rubber manufactured under the tradename Kraton by Shell Chemical Co. or manufactured under the tradename Santoprene by Monsanto Chemical Co. can be used.

If a material having a high melting point is used to make the thermoplastic substrate or tank, a thermosetting elastomeric resin can be used to make the gaskets 12, 70. In other words, if the thermoplastic substrate has a high melting point, an elastomeric resin having a high processing temperature can be used to form the gaskets 12, 70. On the other hand, if the thermoplastic substrate has a low melting point, an elastomeric resin having a low processing temperature must be used.

Thus, if the thermoplastic substrate comprises a nylon or polyester material (high melting points), a thermosetting elastomeric resin such as EPDM (high processing temperature) can be used to form the gaskets 12, 70.

Other types of thermosetting elastomeric resins which could be used include: nitrile rubber, natural rubber, reclaimed rubber, isoprene (synthetic) rubber, styrene butadiene rubber, butadiene rubber, butyl rubber, chlorobutyl rubber, bromobutyl rubber, polysulfide rubber, ethylene propylene copolymer (EPM), polychloroprene, epichlorohydrin homopolymer, epichlorohydrin/ethylene oxide copolymer, chlorinated polyethylene, chlorosulfonated polyethylene, polyacrylate rubber, polyurethane-ester type, polyurethane-ether type, silicon rubber, fluorosilicone rubber, fluorocarbon rubber, and blends thereof. These thermosetting elastomeric resins should be injected into the mold at pressures in the range of 2,000-3,000 psig and temperatures in the range of 350°-420° F. Molding times range from about 1-2 minutes, preferably 90 seconds. Molding temperatures range from about 350°-450° F., preferably 400° F.

If the thermoplastic substrate comprises a polyethylene or polypropylene material (low melting points), a thermoplastic rubber such as Kraton or Santoprene (low processing temperatures) must be used as the elastomeric resin. These thermoplastic elastomeric resins should be injected into the mold at pressures in the range of 2,000-3,000 psig and temperatures in the range of 350°-420° F. Molding times range from about 15-35 seconds, preferably 25 seconds. Molding temperatures range from about 100°-150° F. Since these resins are overmolded at such low temperatures, preheating of the retaining fingers or the entire tank is not needed. Also, as hereinbefore stated, the gasket molding head need not be preheated either.

Thus, the invention can be practiced as follows. A glass filled nylon resin, having the tradename Vydyne R525HO2 and manufactured by Monsanto Chemical Company, can be injection molded in a conventional mold having upper and lower mold halves to form a tank as, for example, illustrated in FIG. 2. The upper mold half can be removed and the tank removed from the lower mold half. Next, the entire tank can be heated in a forced air oven to about 250° F. The tank can then be placed into a support.

An overmolding head (e.g., gasket molding head) can be clamped onto the tank support so that they contact each other at a pressure of about 3,500 psig. Upon establishing this clamping pressure, upstanding fingers formed in a top surface of the tank are crimped over into channels formed in the tank. An EPDM resin having the following physical properties can be obtained by one skilled in the art of rubber compounding: a tensile strength of 1200-1800 lb/in$^2$, an elongation of 200-600%, a Durometer A hardness of 40-70, low compression set, and suitable heat age resistance.

The EPDM resin can be injected at a pressure of about 2,500 psig and a temperature of about 400° F. into a gasket-forming cavity within the mold to overmold a gasket onto the tank. After about 90 seconds, the gasket molding head should be removed from the support and the tank removed from the support. Next, the tank can be placed on a cooling form. The gasket thus formed is retained in the tank channels by the retaining fingers.

Reasonable variations or modifications are possible within the spirit of the foregoing specification and drawings without departing from the scope of the invention which is defined in the accompanying claims.

The embodiments of the invention in which an exclusive property or privilege is claimed are defined as follows:

1. A method for forming a heat exchanger tank having a gasket on a sealing rim of the tank, the method comprising the steps of:
   molding a heat exchanger tank with a channel in the sealing rim and a retaining projection on the sealing rim, wherein the retaining projection has a side substantially in common with the channel;
   deforming the retaining projection into an upper portion of the channel to thereby provide a stake; and
   overmolding a gasket to the tank and into the channel to mechanically interlock the gasket and the tank through the stake.

2. A method according to claim 1 wherein the retaining projection is deformed during the overmolding step.

3. A method according to claim 1 wherein there are multiple retaining projections spaced along the sealing rim adjacent the channel.

4. A method according to claim 1 wherein the retaining projection comprises an upper ramped surface which extends upwardly toward the channel.

5. A method according to claim 1 wherein the tank is formed of a thermoplastic resin.

6. A method according to claim 5 wherein the tank is formed of a nylon resin.

7. A method according to claim 5 wherein the gasket is formed of an elastomeric resin.

8. A method according to claim 5 wherein the gasket is formed of a thermosetting rubber.

9. A method according to claim 4 wherein the gasket is formed of a thermoplastic rubber.

10. A method of attaching an elastomeric shape to a thermoplastic substrate comprising the steps of:
    forming a substrate with at least one slot and an upstanding projection with a side substantially in common with the slot;
    deforming the projection into an upper portion of the slot to thereby provide a stake; and
    molding the elastomeric shape onto the substrate and into the slot, whereby the elastomeric shape is mechanically retained on the substrate through the stake.

11. A method of attaching an elastomeric shape to a thermoplastic substrate according to claim 10 and further comprising the step of heating the substrate projection before the deforming step.

12. A method of attaching an elastomeric shape to a thermoplastic substrate according to claim 11 wherein the thermoplastic substrate is a nylon resin.

13. A method of attaching an elastomeric shape to a thermoplastic substrate according to claim 12 wherein the elastomeric shape is a thermosetting elastomeric resin.

14. A method of attaching an elastomeric shape to a thermoplastic substrate according to claim 11 wherein the elastomeric shape is an EPDM polymer.

15. A method of attaching an elastomeric shape to a thermoplastic substrate according to claim 10 wherein the elastomeric shape is an EPDM polymer.

16. A method of attaching an elastomeric shape to a thermoplastic substrate according to claim 10 wherein the upstanding projection has an upper ramp surface which, prior to the deformation step, extends upwardly toward the 17. A method of attaching an elastomeric shape to a thermoplastic substrate according to claim 10 wherein the projection is deformed by moving a molding head into contact with the projection just before the molding step.

* * * * *